(12) United States Patent
Ogatsu

(10) Patent No.: US 9,374,445 B2
(45) Date of Patent: Jun. 21, 2016

(54) CASING FOR PORTABLE DEVICE

(71) Applicant: Toshinobu Ogatsu, Tokyo (JP)

(72) Inventor: Toshinobu Ogatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/630,862

(22) Filed: Feb. 25, 2015

(65) Prior Publication Data

US 2015/0207906 A1  Jul. 23, 2015

Related U.S. Application Data

(63) Continuation of application No. 11/813,613, filed as application No. PCT/JP2006/316479 on Aug. 23, 2006, now Pat. No. 8,989,823.

(30) Foreign Application Priority Data

Aug. 25, 2005  (JP) ................ 2005-244822

(51) Int. Cl.
*H04M 1/02* (2006.01)
*G06F 1/16* (2006.01)
*H04M 1/23* (2006.01)
(Continued)

(52) U.S. Cl.
CPC ......... *H04M 1/026* (2013.01); *B29C 45/14336* (2013.01); *G06F 1/1616* (2013.01); *G06F 1/1656* (2013.01); *G06F 1/1662* (2013.01); *H04M 1/0249* (2013.01); *H04M 1/23* (2013.01); *B29C 45/14311* (2013.01); *B29L 2031/445* (2013.01)

(58) Field of Classification Search
CPC ... H04M 1/23; H04M 1/0247; H04M 1/0237; H04M 1/0214; H04B 1/3833; H04B 1/3838; H04B 1/0283
USPC ............................................ 455/575.1, 575.8
See application file for complete search history.

(56) References Cited

U.S. PATENT DOCUMENTS

| | | | |
|---|---|---|---|
| 5,872,699 A | 2/1999 | Nishii et al. | |
| 5,925,847 A * | 7/1999 | Rademacher et al. | 174/372 |
| 6,341,227 B1 * | 1/2002 | Moster et al. | 455/550.1 |

(Continued)

FOREIGN PATENT DOCUMENTS

| | | |
|---|---|---|
| DE | 4109397 A1 | 9/1992 |
| EP | 0641643 A2 | 3/1995 |

(Continued)

OTHER PUBLICATIONS

Communication dated Mar. 17, 2015 from the Japanese Patent Office in counterpart Application No. 2014-139535.

(Continued)

*Primary Examiner* — Marisol Figueroa
(74) *Attorney, Agent, or Firm* — Sughrue Mion, PLLC

(57) ABSTRACT

A box-shaped metal structure is formed by press-working or the like, and a resin shell is integrally molded to the periphery of the metal structure by extrusion molding a resin. A flexible circuit board for key switches is disposed on a switch-receiving surface of the metal structure. The resin shell and the box-shaped metal structure are not bonded together, but the resin fills the connecting holes in the metal structure, whereby the shell and the metal structure are kept together after molding. A casing for a portable device having a structure suitable for obtaining reduced thickness and size reduction is thereby obtained.

12 Claims, 16 Drawing Sheets

(51) Int. Cl.
*B29C 45/14* (2006.01)
*B29L 31/44* (2006.01)

(56) References Cited

U.S. PATENT DOCUMENTS

| | | | |
|---|---|---|---|
| 6,437,238 | B1 | 8/2002 | Annerino et al. |
| 6,754,507 | B2 | 6/2004 | Takagi |
| 6,768,654 | B2 | 7/2004 | Arnold et al. |
| 7,423,704 | B2 * | 9/2008 | Cho et al. .............. 349/58 |
| 8,989,823 | B2 * | 3/2015 | Ogatsu .............. 455/575.1 |
| 2002/0021549 | A1 | 2/2002 | Kono et al. |
| 2002/0125815 | A1 * | 9/2002 | Wakita .............. G02F 1/133308 313/491 |
| 2003/0224837 | A1 | 12/2003 | Kuriyama et al. |
| 2004/0132514 | A1 * | 7/2004 | Lee .............. 455/575.3 |
| 2004/0203514 | A1 | 10/2004 | Cheng et al. |
| 2006/0160585 | A1 | 7/2006 | Miyagawa et al. |
| 2007/0021159 | A1 | 1/2007 | Kaneoya |

FOREIGN PATENT DOCUMENTS

| | | | |
|---|---|---|---|
| JP | 1-198099 | A | 8/1989 |
| JP | 4-117850 | A | 4/1992 |
| JP | 6-29669 | A | 2/1994 |
| JP | 06029669 | A | 6/1994 |
| JP | 7-58476 | A | 3/1995 |
| JP | 7-058815 | A | 3/1995 |
| JP | 7-124995 | A | 5/1995 |
| JP | 8-274483 | A | 10/1996 |
| JP | 10098275 | A | 4/1998 |
| JP | 2000196249 | A | 7/2000 |
| JP | 2000223855 | A | 8/2000 |
| JP | 2000-253115 | A | 9/2000 |
| JP | 2002-9456 | A | 1/2002 |
| JP | 200251131 | A | 2/2002 |
| JP | 200251132 | A | 2/2002 |
| JP | 2003-229938 | A | 8/2003 |
| JP | 2003-258446 | A | 9/2003 |
| JP | 2004-211498 | A | 7/2004 |
| JP | 2004-336582 | A | 11/2004 |
| JP | 2005-183991 | A | 7/2005 |
| JP | 2007-060249 | A | 3/2007 |

OTHER PUBLICATIONS

Japanese Office Action issued Sep. 13, 2011 in counterpart Japanese Patent Application No. 2009-020950.
Communication issued Jul. 12, 2012 by the European Patent Office in counterpart European Application No. 06782932.5.
Communication dated Apr. 1, 2014, issued by the Japanese Patent Office in corresponding Application No. 2011-249190.

* cited by examiner

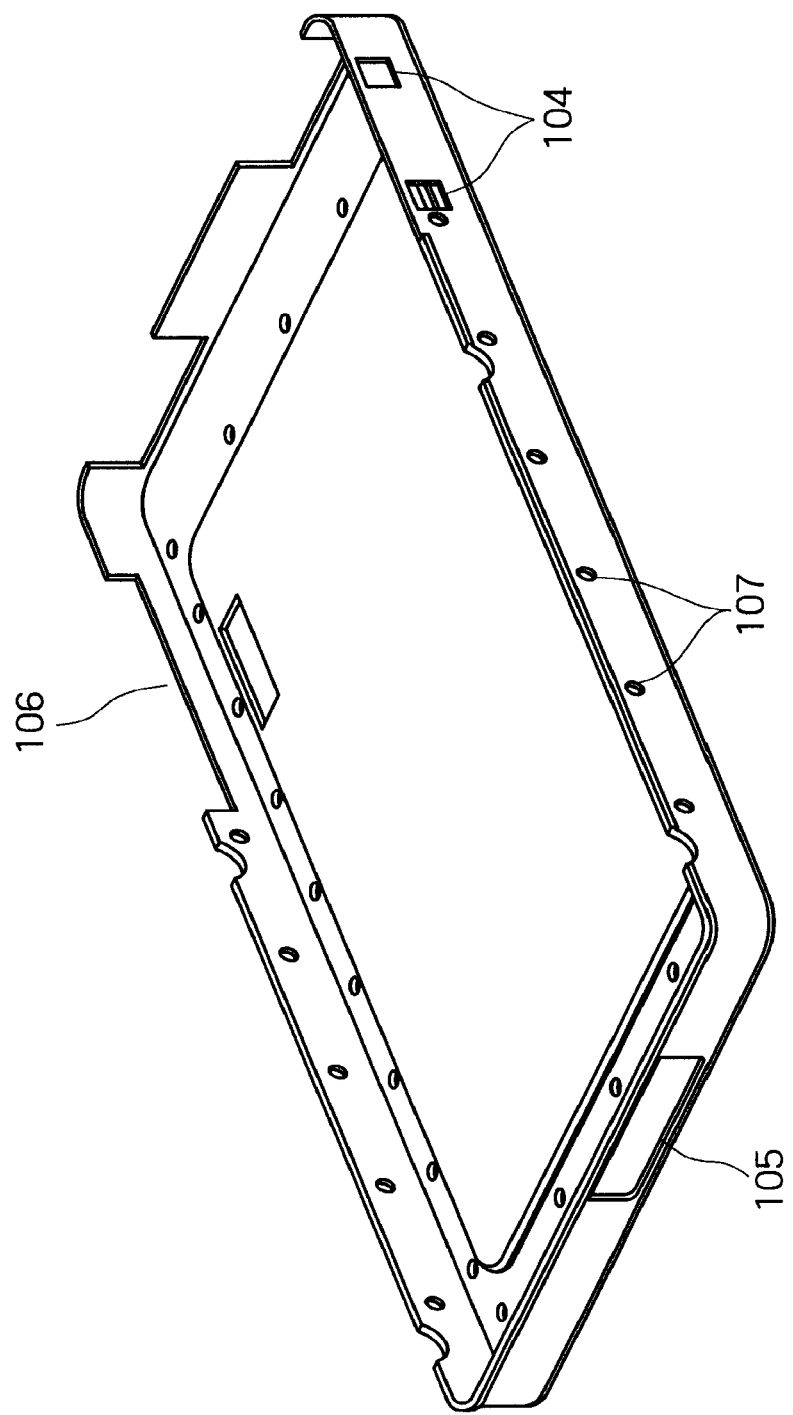

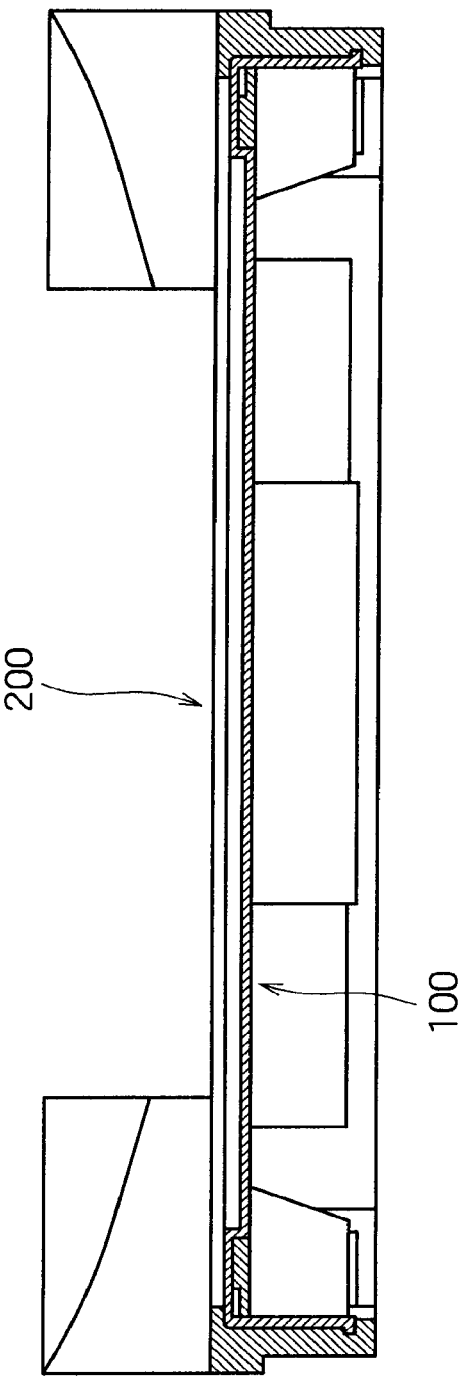

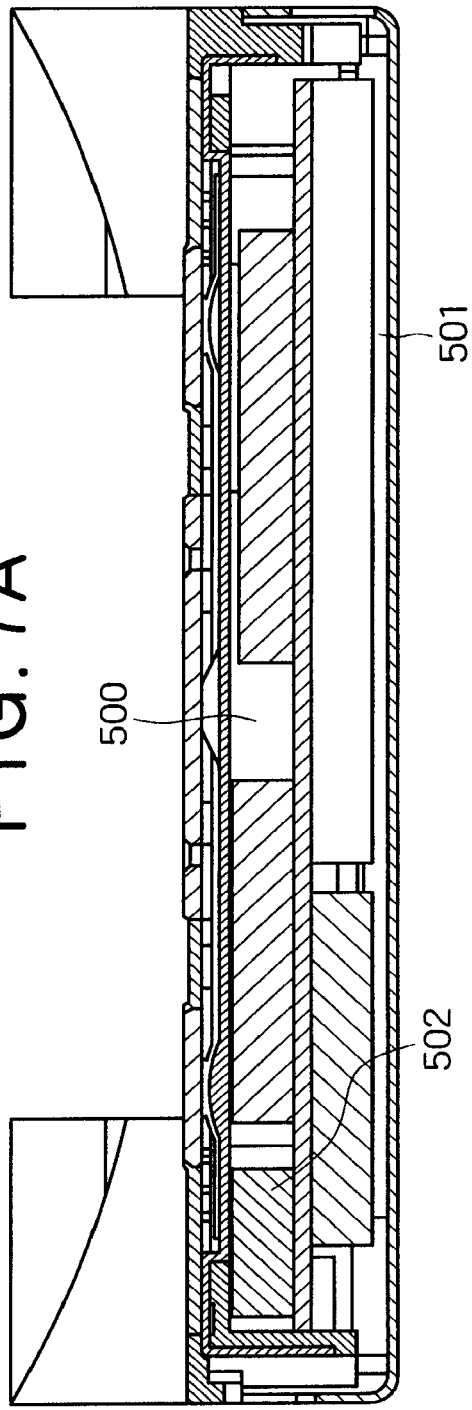
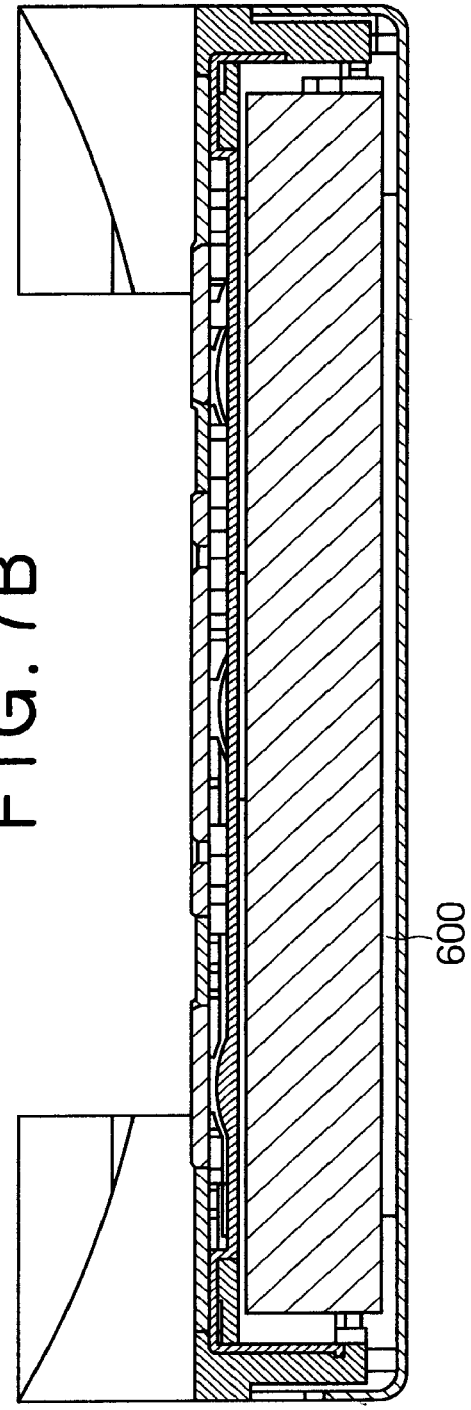

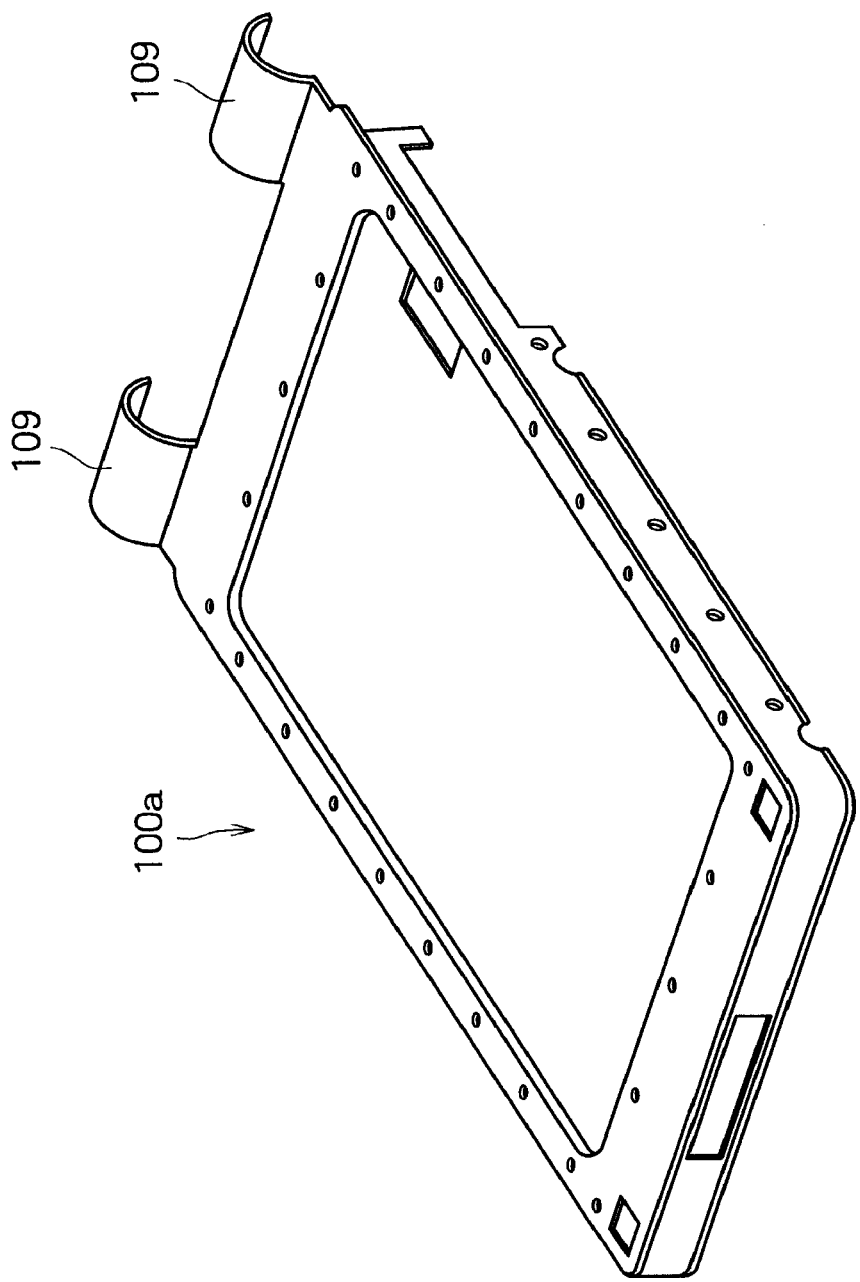

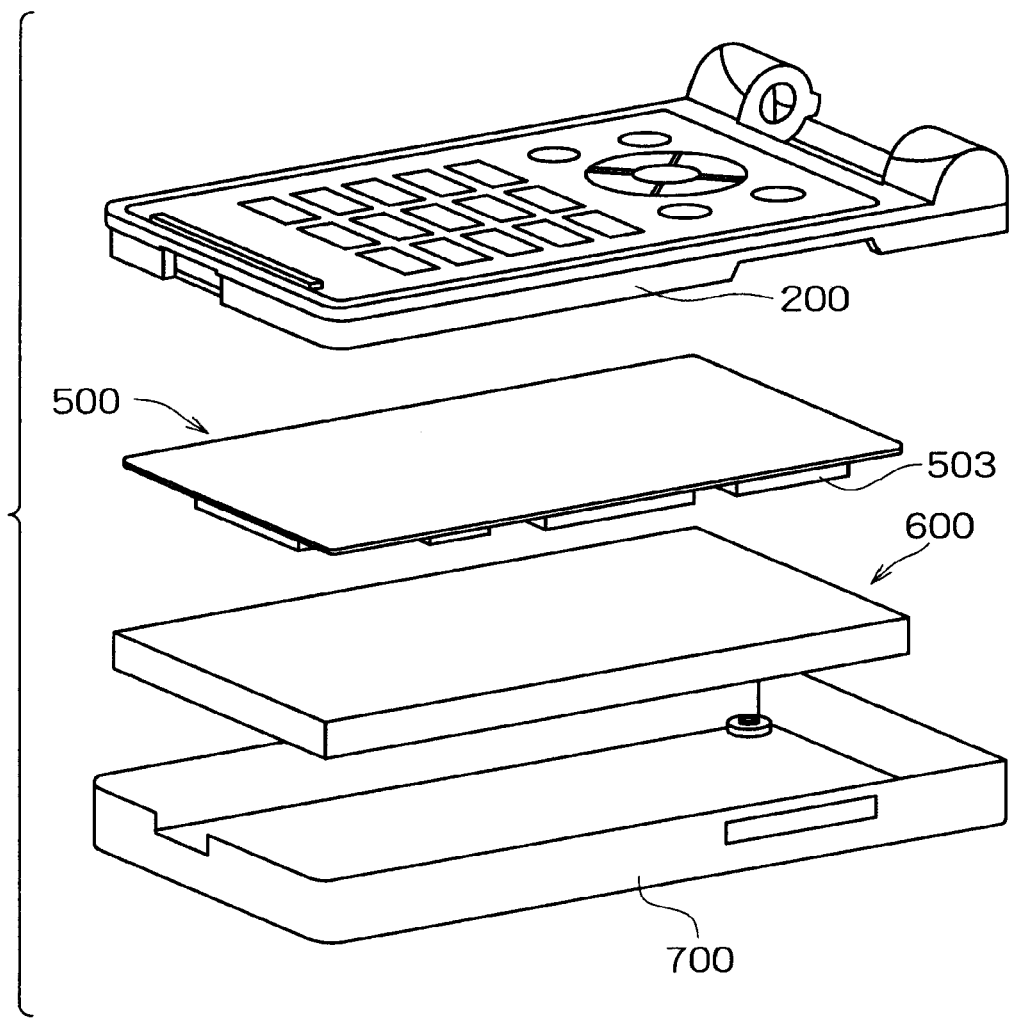

CASING FOR PORTABLE DEVICE

CROSS REFERENCE TO RELATED APPLICATIONS

This application is a Continuation application of U.S. application Ser. No. 11/813,613 filed Sep. 10, 2007, which is a National Stage of International Application No. PCT/JP2006/316479, filed Aug. 23, 2006, claiming priority from Japanese Patent Application No. 2005-244822, filed Aug. 25, 2005, the contents of all of which are incorporated herein by reference in their entirety.

TECHNICAL FIELD

The present invention relates to a casing for a portable phone or another such portable device, and particularly relates to the improvement of a casing structure whereby the casing can be made smaller and thinner, yet strength can be ensured.

BACKGROUND ART

While broader needs in portable phones have created strong demand for higher functions such as camera functions and larger screens, there is also strong demand for smaller and thinner phones in terms of portability. Various structures have been proposed in response to these conflicting demands. The same applies to PDAs (Personal Digital Assistance: portable information terminals) and other such portable devices. Generally, in casing structures used for portable devices, resin components or metal components are loosely fitted together and are either fixed in place with pawls or the like, or are fixed in place or enclosed by screw-fastening. In many cases, a combination of these methods is used. A cushion or the like is also sometimes attached in order to prevent deformation in the external casing from reaching the interior. Since the key switch portion requires a configuration that does not transfer keystroke force to internal components, a keystroke frame is sometimes used to cover a shield frame commonly formed on the mounting substrate, or both surfaces of a rigid mounting substrate are sometimes used and the key switches are formed on the back surface. Sometimes configurations are adopted in which a metal casing is used and the key switches are attached on top of the casing. Furthermore, as described in Patent Document 1, a structure for bearing the switch load is sometimes provided.

[Patent Document 1] Japanese Patent Application Kokai Publication No. 2003-229938

DISCLOSURE OF THE INVENTION

Problems the Invention is Intended to Solve

However, the casing structure disclosed in Patent Document 1 is subject to a few problems. The first problem is that when a structure is adopted in which the load is borne by a shield frame formed on the mounting substrate, the height of the shield frame must be aligned. The height of the mounting components differs with each component, but in this case the height of the shield frame must be aligned with the tallest component. Furthermore, nonuniformities in mounting the shield frame must be taken into account, and another frame must be provided over the shield frame. These and other requirements are an obstacle to producing a thinner device.

The second problem is that in cases in which a structure is used to bear the load on the back surface of the mounted components, the substrate is subjected to stress from the keystrokes, and the effect on the mounted components is a cause for concern. Specifically, a device for reducing deformation in the substrate is needed in order to protect the mounted components, or the thickness of the substrate is increased to some extent. These and other measures are an obstacle to thinning the device.

The third problem is that in cases in which a structure of a separate component is used as described in Patent Document 1, this structure is effective in alleviating stress, but is also an obstacle to producing a thinner device. In cases in which a structure is attached on top of the casing, a certain thickness must be ensured due to limits on the molded thickness of the casing components, which is of course an obstacle to thinning the device.

The present invention was designed in view of these problems, and an object thereof is to improve on the structure of a casing for switches in a portable device, and to provide a casing for a portable device that has a structure suitable for reducing the thickness and size.

Means for Solving the Problems

The casing for a portable device according to the present invention is characterized in comprising an internal metal structure having a first bottomed concave shape, and a resin shell that has a frame shape and that is formed by the integral molding of an external material that has greater thermal shrinkage during cooling than the constituent material of the internal metal structure, in an outside region of the internal metal structure and in an inside region connected thereto.

In the present invention, the metal structure is formed into a bottomed concave shape by drawing a thin metal plate, and the metal structure is therefore resistant to deformation in the twisting direction and the bending direction. Therefore, the surface of this box is provided with a key switch holding surface for accommodating key switches, whereby keystroke stress on the switch surface can be sufficiently withstood even if the metal structure is thin, and internally mounted components are not affected. Also, since a resin shell is provided to the outside surface of the metal structure through extrusion molding or the like, the casing of the present invention remains thin and highly rigid, while resin molding ensures an attractive design in the exterior.

The material of the internal metal structure is preferably, e.g., stainless steel, common steel, or titanium, and the metal structure is preferably molded by sheet metal drawing. The metal structure is also preferably formed by sintering based on die casting, metal molding, or metal injection molding.

The resin shell preferably keeps a battery and a mounting substrate having mounting components in thermal contact with the metal structure. The heat of the battery and the mounted components can thereby be radiated via the metal structure, and thermal radiation can be improved. Electromagnetic shielding is improved because the mounted components are covered with the metal structure.

Furthermore, the metal structure preferably has a box shape formed by a portion in which key switches are placed, and a side wall portion connected thereto. Internal components are thereby more reliably protected.

Furthermore, the resin shell may have a hinge part to which another casing is rotatably connected, and the hinge part may be formed from a highly elastic resin material. Configuring this hinge part from a highly elastic material makes it possible to absorb impact in the hinge portion when the portable device is dropped or the like, to protect internal components in the solid metal bottomed concave shape, and to reduce the amount of plastic deformation throughout the entire casing.

The other casing for a portable device according to the present invention is characterized in comprising an internal metal structure having a first bottomed concave shape, and a resin shell that has a frame shape and that is formed by the integral molding of an external material that has greater thermal shrinkage during cooling than the constituent material of the internal metal structure, in an outside region of the internal metal structure and in an inside region connected thereto.

Effects of the Invention

According to the present invention, the keystroke load on the key switch surface is not transferred to internal components, and can be efficiently distributed from the front surface of the casing to the back surface. Also, according to the present invention, plastic deformation in the metal can be reduced because the resin is integrally molded to the metal structure. Furthermore, according to the present invention, since the metal casing and the resin casing are integrally molded by extrusion molding or the like, they are not bonded together and the metal and resin can be easily separated and recycled.

BRIEF DESCRIPTION OF THE DRAWINGS

FIGS. 1A and 1B are perspective views showing the structure of a portable device casing according to an embodiment of the present invention, wherein FIG. 1A is a view from above and FIG. 1B is a view from below;

FIG. 3 is a perspective view of the metal structure 100 as seen from the reverse side;

FIG. 4 is a cross-sectional view of the casing shown in FIG. 1;

FIGS. 7A and 7B are cross-sectional views of the assembled casing, wherein FIG. 7A is a horizontal cross-sectional view along a line that cuts through a connector 501 shown in FIG. 6, and FIG. 7B is a horizontal cross-sectional view along a line that cuts through a battery 600;

FIG. 8 is a perspective view showing the metal structure 100 of the second embodiment of the present invention;

FIG. 9 is an exploded view showing the portable device of the third embodiment of the present invention;

Figures 1A, 1B:
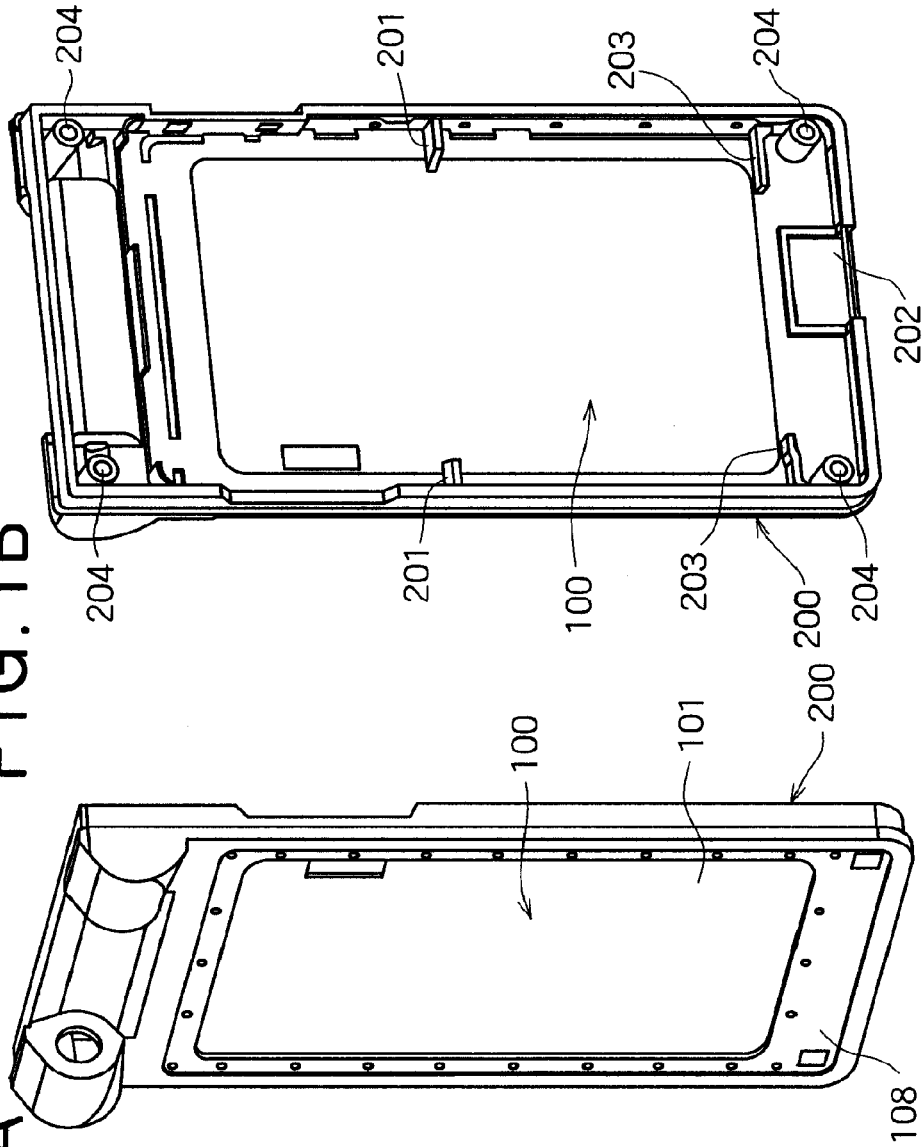

KEY 100, 100a, 100b, 100c metal structure
101 switch-receiving surface
102 ribs
103 wire hole
104 side switch holes
105 recess
106 recess
107 anchors
107 connection holes
108 key attachment surface
109 shape
110 rib
111 recess
112 rib
200 resin shell
201 ribs
202 rib
203 ribs
204 bosses
205 hinge part
206 ribs
207 press holes
300 flexible circuit board
301 wires
302 dome switches
303 backlights
400 key sheet unit
500 substrate
501 connector
502 side switch
503 component
600 battery
700 rear cover

BEST MODE FOR CARRYING OUT THE INVENTION

Figure 2:
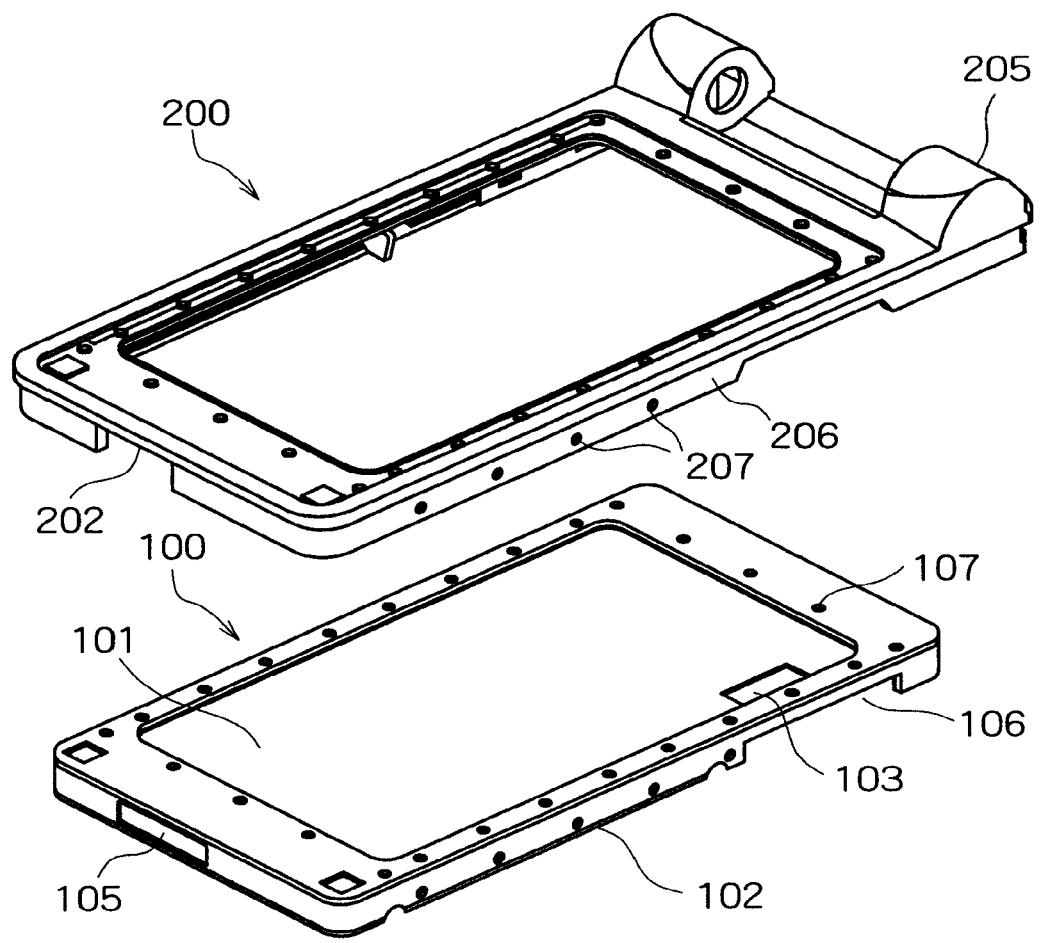
FIG. 2 is an exploded view showing a metal structure 100 of the casing as being separated from the portable device shown in FIG. 1.
Figure 5C:
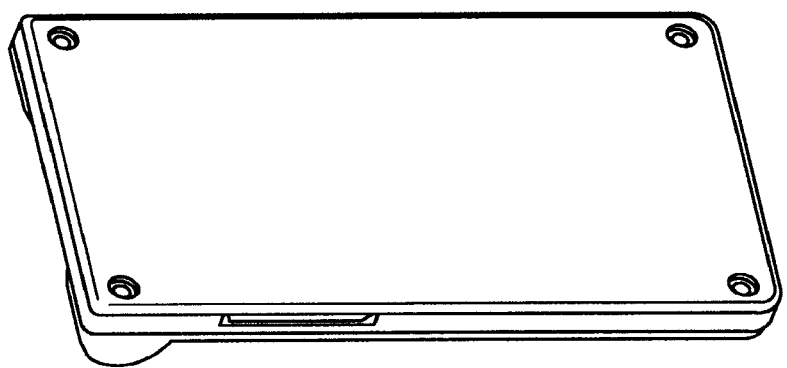
FIGS. 5A through C are perspective views of the portable device after a bottom casing having switches has been incorporated.
Figure 5B:
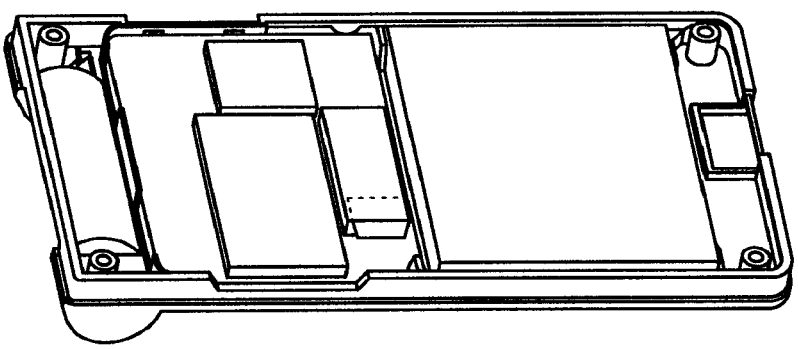
Figure 5A:
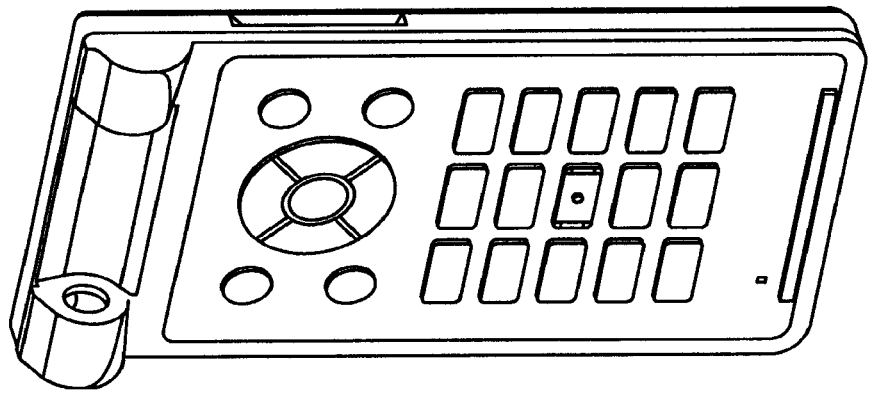
Figure 6:
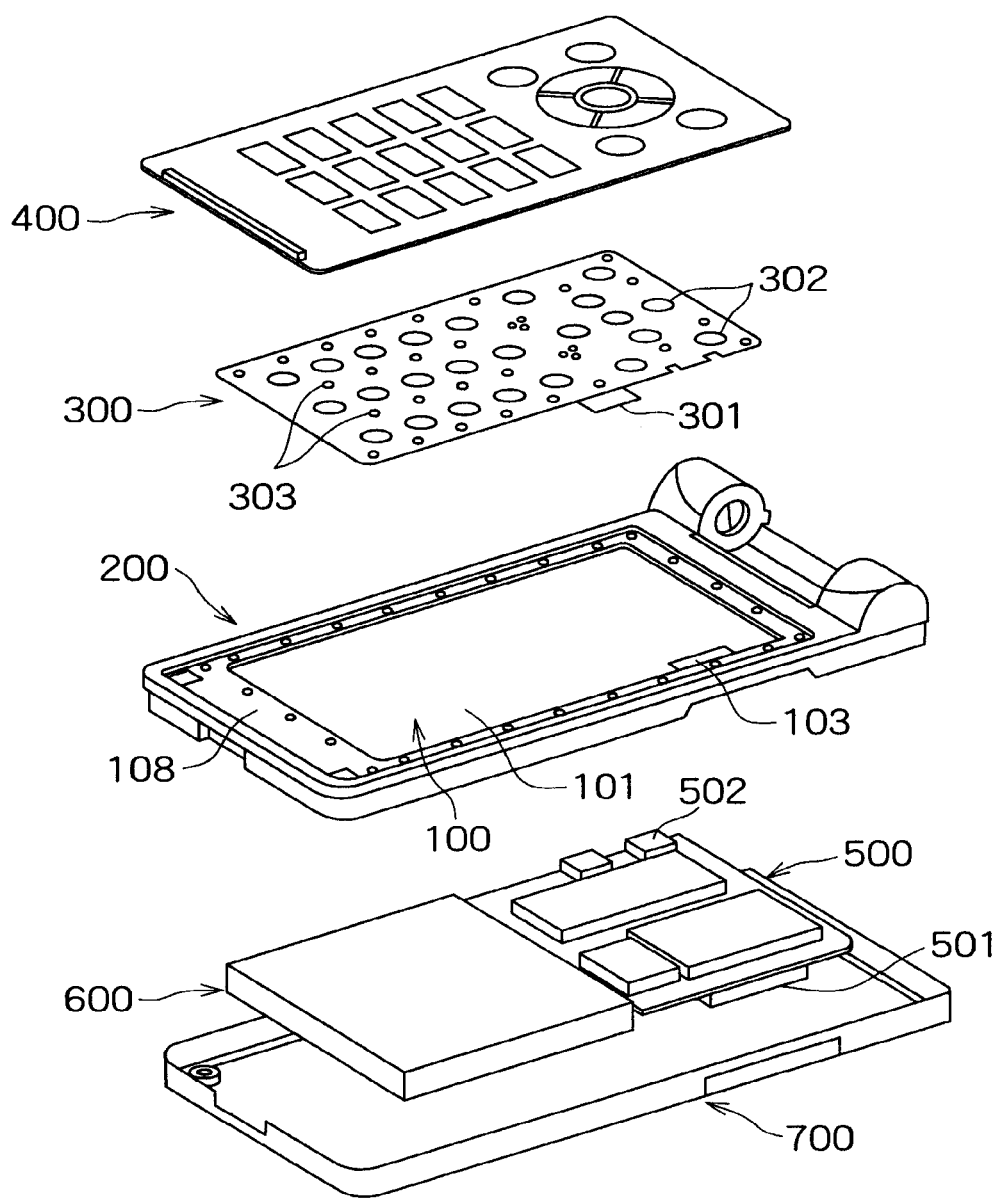
FIG. 6 is an exploded perspective view of the portable device shown in FIG. 5.

Next, the embodiments of the present invention will be described with reference to the attached diagrams. FIG. 1 is a perspective view showing the structure of a portable device casing according to an embodiment of the present invention, wherein 1A is a view from above and 1B is a view from below. FIG. 2 is an exploded view showing a metal structure 100 of the casing as being separated from the portable device shown in FIG. 1. FIG. 3 is a perspective view of the metal structure 100 as seen from the reverse side. FIG. 4 is a cross-sectional view of the casing shown in FIG. 1. FIGS. 5A through C are perspective views of the portable device after a bottom casing having switches has been incorporated. FIG. 6 is an exploded perspective view of the portable device shown in FIG. 5. FIG. 7 is a cross-sectional view of the assembled casing, wherein 7A is a horizontal cross-sectional view along a line that cuts through a connector 501 shown in FIG. 6, and 7B is a horizontal cross-sectional view along a line that cuts through a battery 600.

The metal structure 100 is a metal plate shaped as a bottomed concavity by thin-plate drawing or press molding, and is the primary structure of the casing. This metal structure 100 is provided with a switch-receiving surface 101 on which a flexible circuit board for the key switches is disposed, peripheral ribs 102 provided on the periphery in order to ensure overall rigidity, a wire hole 103 through which pass the wires of the key switch circuit board, side switch holes 104 for providing switches to the longitudinal side, a connector recess 105 for accommodating a connector in the transverse side, a card slot recess 106 for attaching a PCMCIA (Personal Computer Memory Card International Association) card or the like to the longitudinal side, and connection anchors 107 for forming a connection with a resin during integral molding. The metal structure 100, which is a box-shaped metal casing, is about 0.2 mm to 0.5 mm thick, for example, and is obtained by press-working a stainless steel thin plate, a thin steel plate, a titanium thin plate, or a thin plate of another such metal. The switch-receiving surface 101 also functions as a second bottomed concavity, and the torsional rigidity and flexural rigidity of the entire metal casing are increased by work hardening and by increasing the second moment of area. The metal structure is still effective if, instead of using thin-plate drawing, the metal structure is formed by sintering as typified by die casting, metal molding, or metal injection molding. Sintering is inferior in terms of reducing the thickness of the structure, but sintering has the advantage of allowing the ribs on the inside of the casing to be provided to the metal structure.

A resin shell 200 is integrally molded with the metal structure 100 to form a casing for a portable device. Specifically, the metal structure 100 and the resin shell 200 can be integrally molded by extrusion molding a resin at a specific position on the metal structure 100. The resin shell 200 and the box-shaped metal structure 100 are not bonded together, but the two molded parts are still held together by filling the connection holes 107 of the metal structure 100 with the resin. Furthermore, from a structural standpoint, since the box-shaped metal structure 100 is integrally molded so that the resin shell 200 uniformly covers the periphery, the metal has a smaller percentage of shrinkage than the resin due to the difference in thermal expansion between the metal and the resin. The metal structure 100 and the resin shell 200 are therefore sealed together by the shrinkage of the resinous part after the resin has been molded. The metal structure 100 is shaped as a regular plate at this time, and when the structure is merely folded, warpage sometimes occurs in the casing structure due to shrinkage during cooling. In the present invention, deformation after molding can be reduced to a minimum because the bottomed concave shape of the metal structure allows the metal structure to overcome the stress of shrinkage. Also, a resin shell was used in this example, but the resin may be replaced with a metal shell obtained by a process similar to resin extrusion molding. Examples of such methods include thixomolding of magnesium alloys and die casting of magnesium, aluminum, or zinc alloys. In this case, the thermal expansion coefficient of the constituent material of the metal structure must be greater than the thermal expansion coefficient of the constituent material of the interior metal structure.

The resin shell 200 is composed of ribs 201 for fixing an internal mounting substrate, a rib 202 for securing a connector, ribs 203 for fixing a battery, screw bosses 204 for fixing a rear cover, and a hinge part 205 for establishing a connection with a top casing (not shown) constituting a display part. Furthermore, peripheral resin ribs 206 that cover the peripheries of the peripheral ribs 102 of the box-shaped metal structure 100 are formed on the resin shell 200. The peripheral resin ribs 206 are also provided with press holes 207 for preventing the peripheral ribs 102 from being deformed by resin that flows out during molding.

Sheet metal components formed by press molding commonly have narrow elastic deformation regions, and are therefore highly rigid yet plastically deformable. To reduce plastic deformation, either the sheet thickness must be increased, or a material having a wider elastic deformation range must be used. However, increasing the sheet thickness more than is needed from the standpoint of strength is contradictory to the requirements that portable devices be thin, small, and lightweight. Therefore, it is preferable to use a material having a wide elastic deformation region, but moldability is reduced in this case. The structure of the present invention can be formed using a metal material whose elastic deformation region is within a range that allows the shape of the box-shaped metal structure 100 to be obtained, and the plastic deformation of the metal structure 100 is reduced at the same time by the use of the resin shell 200. Specifically, since the peripheral ribs 102 and the peripheral resin ribs 206 deform in integral fashion, the peripheral ribs 102 are not likely to add to the load distribution of the peripheral resin ribs or to buckle when subjected, for example, to a bending load, and the amount of plastic deformation is therefore far less than it would be with only one set of ribs.

The following is a description, made primarily with reference to FIG. 6, of the device configuration and assembly method for the bottom casing of the portable device according to the present embodiment. A flexible circuit board 300 for key switches is mounted on the resin shell 200 that is integrally molded with the box-shaped metal structure 100. Specifically, the wires 301 of the flexible circuit board 300 are passed through the wire hole 103 of the metal structure 100 to bond the flexible circuit board 300 to the switch-receiving surface 101 of the metal structure 100. Dome switches 302 and LED (Light Emitting Diode) backlights 303 are mounted on the flexible circuit board 300. Furthermore, a key sheet unit 400 is attached over the flexible circuit board 300. The key sheet unit 400 is attached to a key attachment surface 108 rather than the switch-receiving surface 101. This makes it possible to prevent water droplets from entering from above. In the present embodiment, LED backlights 303 are used, but another possibility is to use EL (Electroluminescence) backlights instead of LED backlights. In this case, either the EL backlights are installed in the key sheet unit 400, or the EL backlights are inserted between the key sheet unit 400 and the flexible circuit board 300.

A main substrate 500 and a battery 600 are attached on the back surface of the resin shell 200. A SIM connector 501, a side switch 502, and various other mounted components are mounted on both sides of the main substrate 500. A shield component for the wireless part and other such components can also be mounted.

The resin shell 200 and the rear cover 700 are fastened with fixing screws (not shown). The material of the rear cover 700 may be a metal material in order to obtain a thinner device. The material may also be a resin material or an integrally molded material containing a resin and a metal.

The battery 600 and the components mounted on the main substrate 500 are caused to generate heat by the passage of current. In this structure, however, these components are in contact with the interior of the box-shaped metal structure 100, resulting in efficient thermal diffusion and excellent heat radiation. The metal structure 100 can also be used to ground the wires. Furthermore, the metal structure covers all of these mounted components, and therefore exhibits excellent shielding effects.

In the casing for a portable device of the present embodiment configured as described above, the metal structure resists deformation in the bending direction and twisting direction because of the box shape. Therefore, even a thin casing can bear the keystroke stress in the switch surface without any problems. Specifically, the keystroke load on the key switch surface of the key sheet unit 400 can be efficiently distributed from the front surface of the casing to the back surface without being transferred to the interior components. In the present embodiment, low thickness and high rigidity are maintained while external components are mounted by resin molding to ensure an attractive design. Furthermore, it is possible to minimize plastic deformation, which occurs readily in the case of metal casings. In the present embodiment, the metal casing (metal structure 100) and the resin casing (resin shell 200) are integrally molded rather than bonded, and the metal portion and resin portion can therefore be easily separated and recycled.

Next, the second embodiment of the present invention will be described with reference to FIG. 8. FIG. 8 is a perspective view showing the metal structure 100 of the present embodiment. The metal structure 100a of the present embodiment differs from the metal structure 100 shown in FIG. 2 in that part of the surface at one end is molded into hinge shapes 109. Thus, forming hinge shapes 109 on the metal structure 100a makes the molded shape more complicated, but can also improve the strength of the hinge part.

FIG. 9 is an exploded view showing the portable device of the third embodiment of the present invention. As shown in FIG. 9, it is effective to give the substrate 500 and the battery 600 substantially the same size as the resin shell 200, to place all the mounting components 503 on one side (e.g., the bottom surface) of the substrate 500, and to fashion a stacked structure with the resin shell 200 that has the switch surface, the metal structure 100, the substrate 500, and the battery 600. The heat radiation due to contact with the metal structure 100, and the shielding effects of the metal structure 100 are effective in this case as well. In this configuration, wiring efficiency is reduced because the mounting components 503 are disposed on one side, but since the thickness of the battery 600 can be determined irrespective of the thickness of the components mounted on the mounting substrate 500, the battery capacity can be arbitrarily adjusted by the thickness. Placing the mounting components 503 on one side results in less space needed for placing the mounting substrate 500, and since a substrate that is thinner than a conventional substrate can be used as the mounting substrate 500, the structure can be made thinner than a conventional structure.

Figure 10:
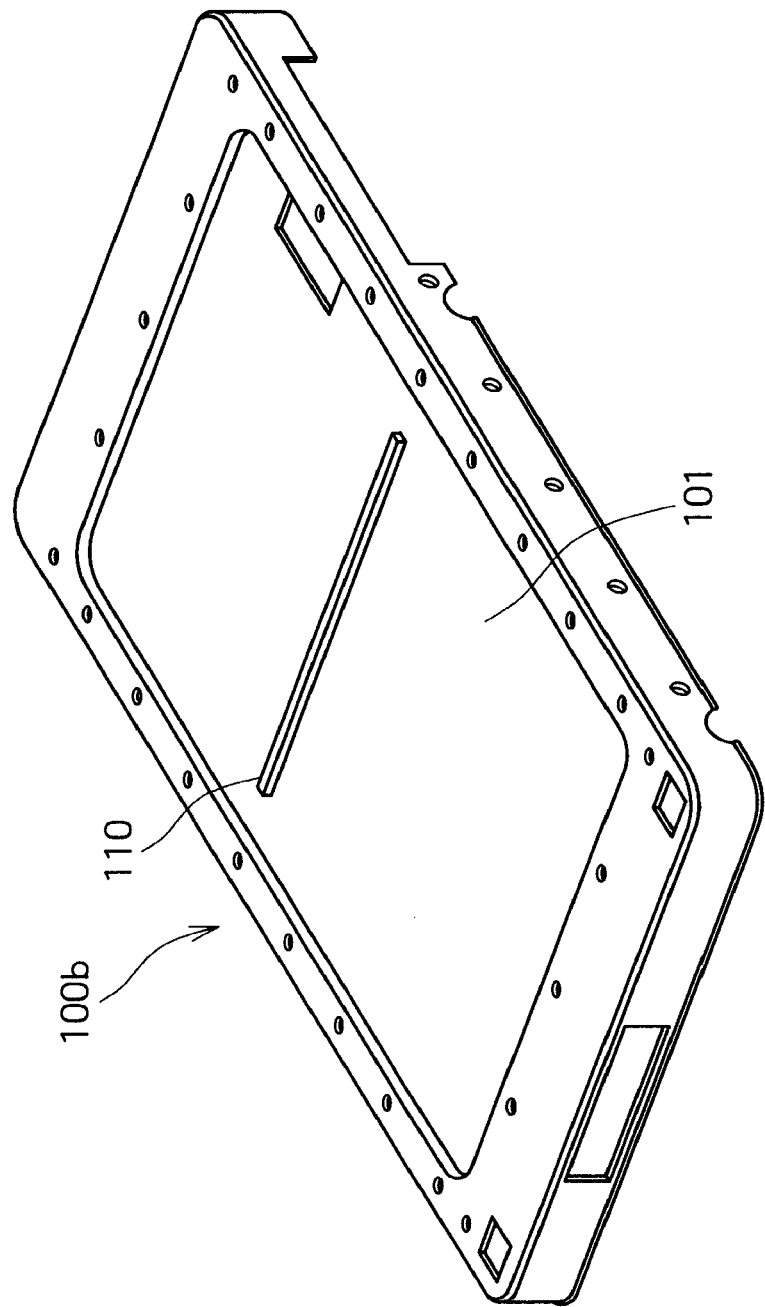
FIG. 10 is a perspective view showing a metal structure 100b of a casing for the portable device of the fourth embodiment of the present invention.

FIG. 10 is a perspective view showing a metal structure 100b of a casing for the portable device of the fourth embodiment of the present invention. In cases in which the casing is comparatively large as shown in FIG. 10, a rib 110 can be molded on the switch-receiving surface 101 of the box-shaped metal structure 100 to increase the rigidity of the switch-receiving surface 101. With this configuration, even if the switch-receiving surface 101 is large, the strength of the switch-receiving surface 101 can be improved and the load exerted by the pressure on the switches can be supported. This rib 110 is also effective as a support to prevent the key sheet unit 400 from being misaligned.

Figure 11:
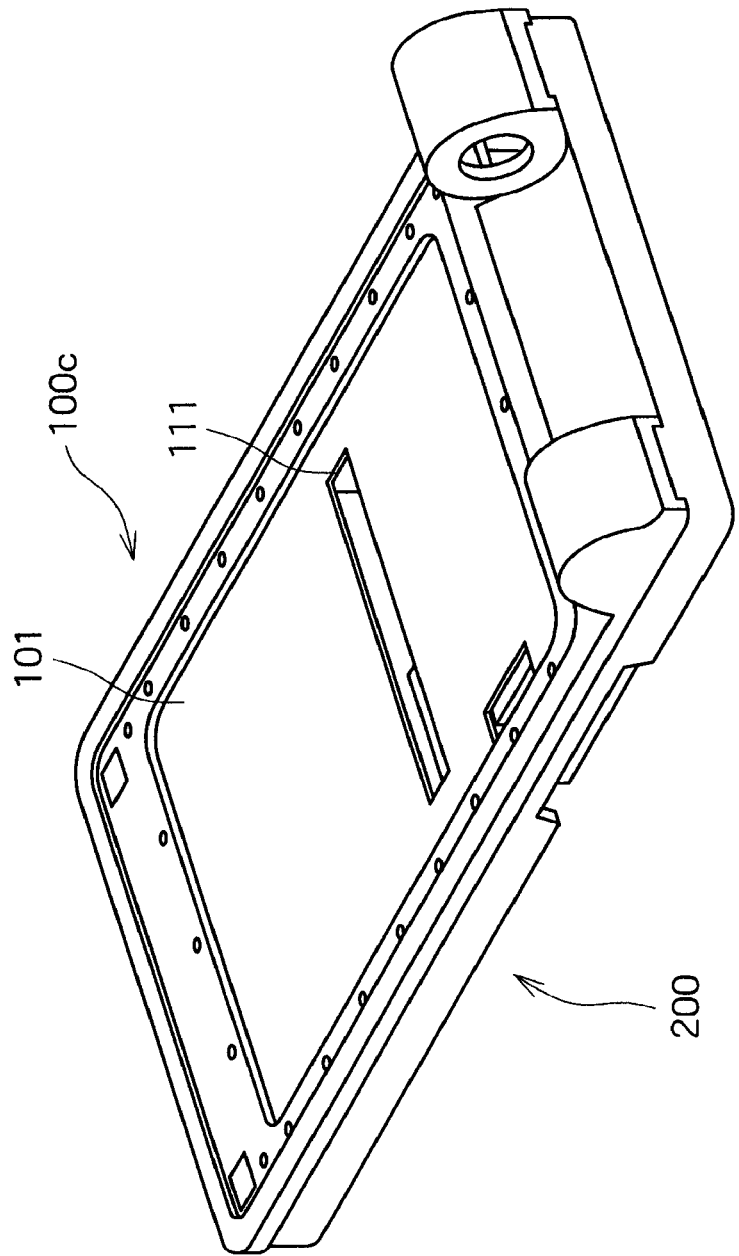
FIG. 11 is a perspective view showing a metal structure 100c and a resin shell 200 of the casing of the portable device of the fifth embodiment of the present invention.
Figure 12:
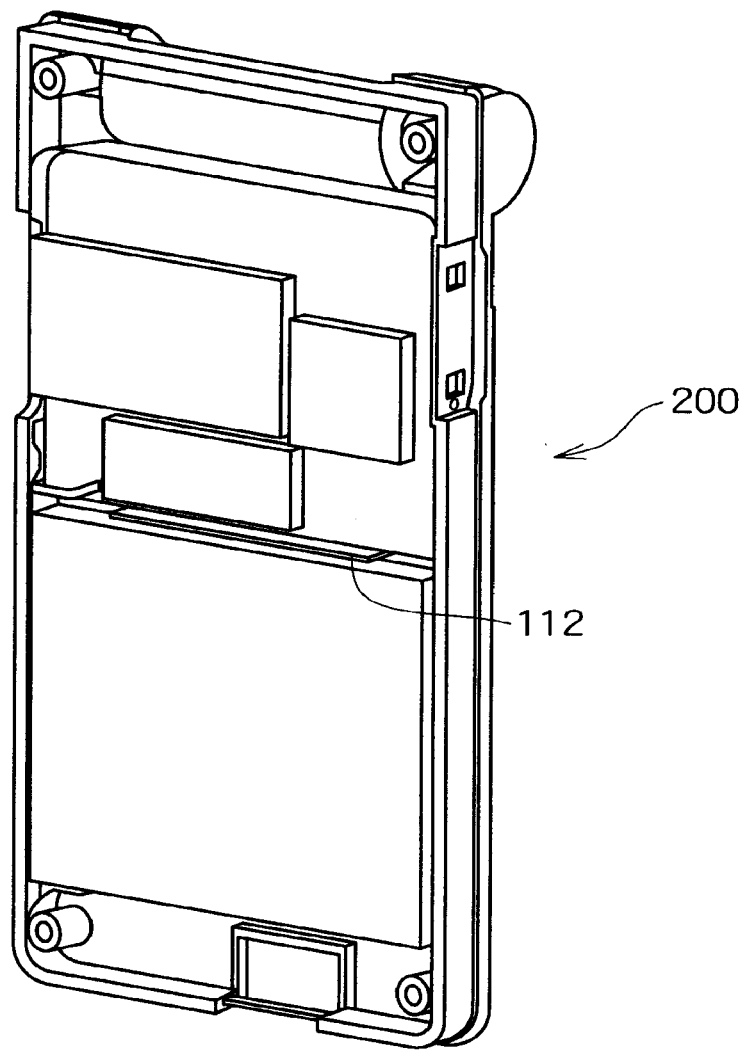
FIG. 12 is a perspective view showing the assembled portable device from the rear after the rear cover has been removed.

FIG. 11 is a perspective view showing a metal structure 100c and a resin shell 200 of the casing of the portable device according to the fifth embodiment of the present invention, and FIG. 12 is a perspective view showing the assembled portable device from the rear, with the rear cover removed. In the present embodiment, a recess 111 is formed in the switch-receiving surface 101 of the metal structure 100c, and this portion can be bent towards the rear to form a rib 112. Although switches cannot be placed in the recess 111, the present embodiment is advantageous in that the rib 112, which acts as a dividing wall for the battery and other interior components, can be formed from a thin metal plate as part of the metal structure 100c.

Figure 13:
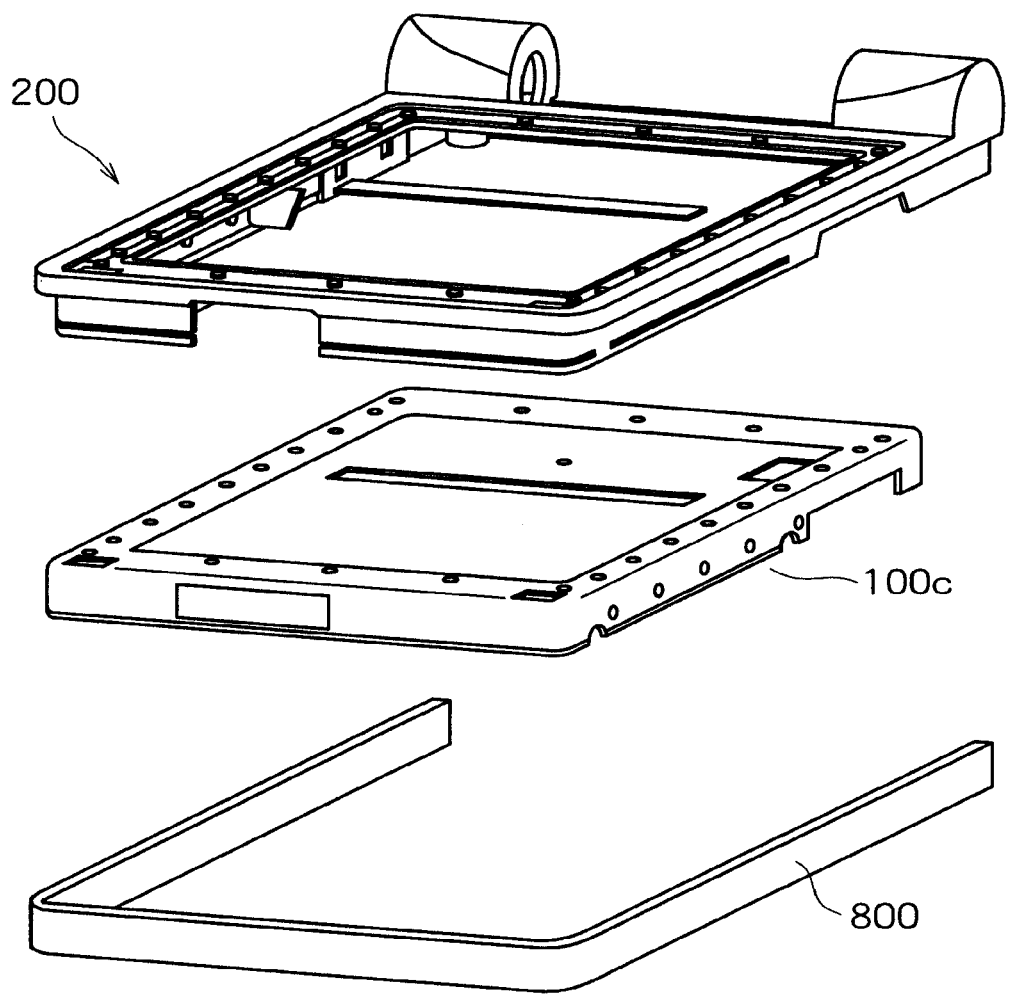
FIG. 13 is an exploded perspective view showing a metal structure 100c, a resin shell 200, and a highly elastic metal frame 800 of the casing of the portable device of the sixth embodiment of the present invention.
Figure 14:
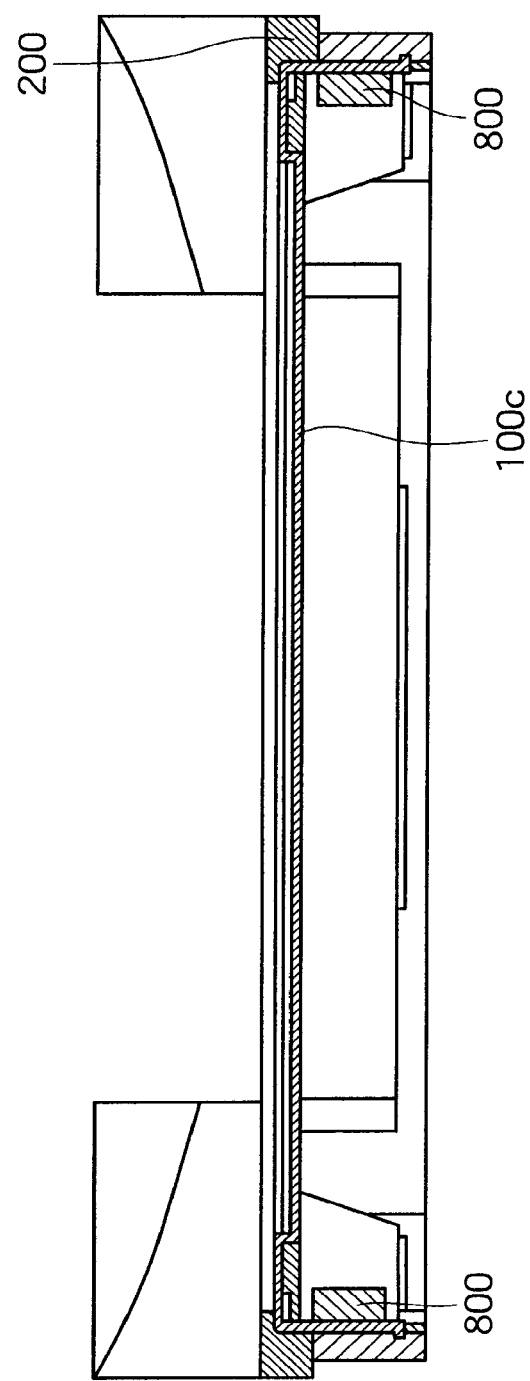
FIG. 14 is a cross-sectional view of FIG. 13.
Figure 15:
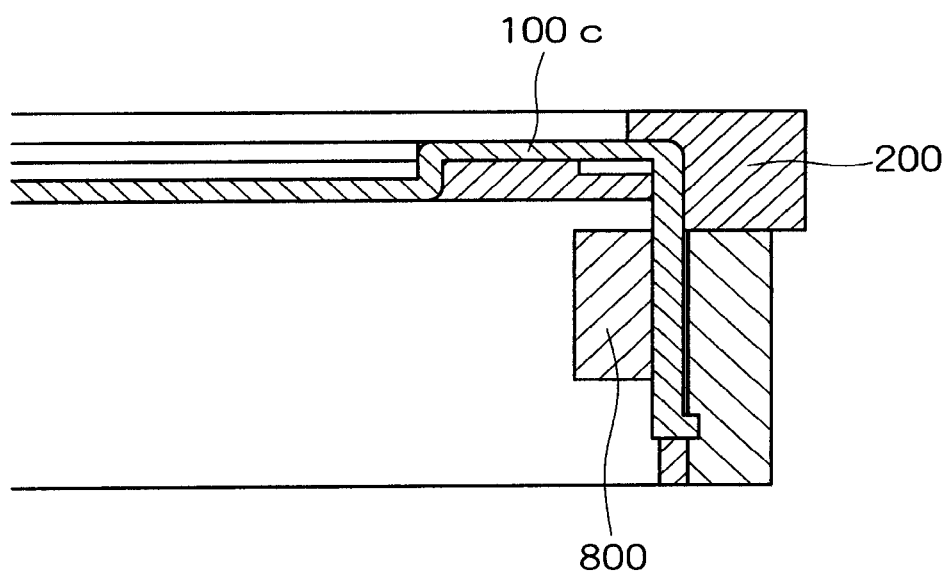
FIG. 15 is an enlarged view of part of FIG. 14.

FIG. 13 is an exploded perspective view showing a metal structure 100c, a resin shell 200, and a highly elastic metal frame 800 of the casing of the portable device according to the sixth embodiment of the present invention; FIG. 14 is a cross-sectional view thereof, and FIG. 15 is an enlarged view of part of FIG. 14. Furthermore, in a device with a thinner casing, in a PDA, in a notebook personal computer, or in any other case in which the aspect ratio between planar surface area and thickness is reduced, integrally molding the highly elastic metal frame 800 as well makes it possible to obtain even higher rigidity when the bottomed concave sheet metal fails to provide sufficient strength or when plastic deformation occurs readily. In this case, the molded materials play the role of maintaining the connections between the metals.

Figure 16A:
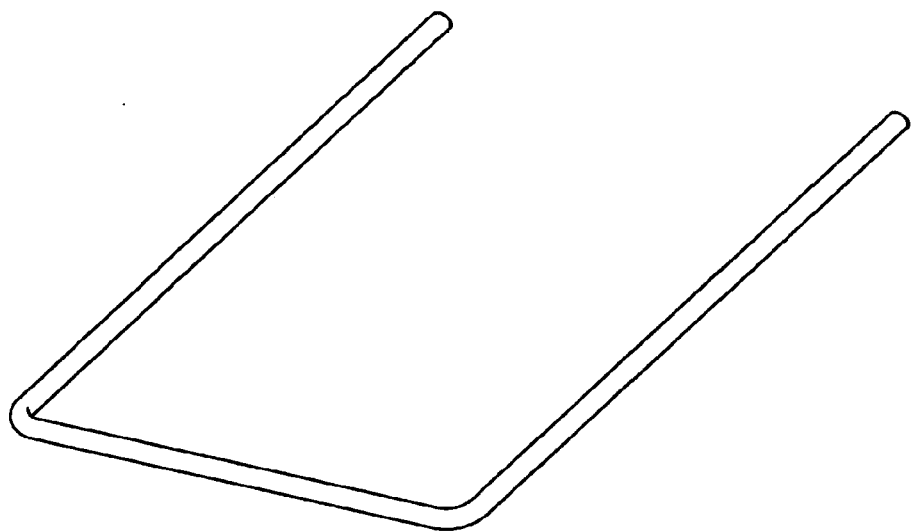
FIG. 16A is a perspective view showing a modification of the highly elastic metal frame 800.
Figure 16B:
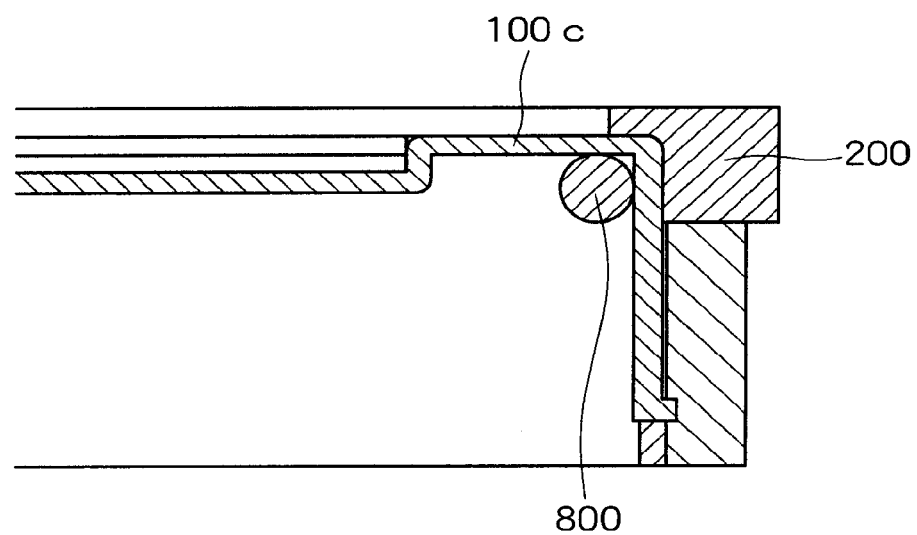
FIG. 16B is a perspective view showing this frame 800 as being attached to the metal structure 100c.

Instead of a square as shown in FIG. 13, the cross-sectional shape of the highly elastic metal frame 800 may be, e.g., a circle as shown in FIG. 16A. In this case, the frame 800 is attached to the metal structure 100c as shown in FIG. 16B.

In the present embodiment, the plate thickness as a factor that affects the thinness of the device is reduced, and strengthening the peripheral portion with the highly elastic metal frame 800 can be considered advantageous in terms of obtaining a thinner device, in contrast to cases in which strength is enhanced by increasing the wall thickness of the metal structure 100c. A disadvantage of a highly elastic material having pronounced spring properties is that when the metal structure is formed by drawing, the material is difficult to form because the drawing creates plastic deformation. However, this drawback is resolved by using a highly elastic metal frame for the frame portion, and the external metal structure can be easily formed by drawing.

INDUSTRIAL APPLICABILITY

The present invention can be used as a casing for a portable phone, a PDA, or another such portable device.

The invention claimed is:

1. A casing for a portable device, comprising:
an internal metal structure having a first bottomed concave shape, and having a convex portion; and
a metal shell that has a frame shape and that is formed by an integral molding of an external material that has greater thermal shrinkage during cooling than a constituent material of the internal metal structure, in an outside region of the internal metal structure and in an inside region connected thereto, wherein
the convex portion is disposed at an end of at least one of a plurality of side walls of the internal metal structure, sticks out to an outside of the first bottomed concave shape, and extends into the metal shell.

2. The casing for the portable device according to claim 1, wherein the internal metal structure and the metal shell closely contact each other.

3. The casing for the portable device according to claim 1, wherein the metal shell has an opening exposing at least a part of a bottom surface of the internal metal structure.

4. The casing for the portable device according to claim 1, wherein side surfaces of the internal metal structure are disposed to surround a bottom surface of the internal metal structure, and the metal shell is disposed to surround the side surfaces.

5. The casing for the portable device according to claim 1, wherein a cutout is formed in a side surface of the internal metal structure.

6. The casing for the portable device according to claim 1, wherein a thermal expansion coefficient of a constituent material of the metal shell is greater than a thermal expansion coefficient of a constituent material of the internal metal structure.

7. The casing for the portable device according to claim 1, wherein a hole is formed in a bottom surface of the first bottomed concave shape.

8. The casing for the portable device according to claim 1, wherein a hole is formed in a side surface of the internal metal structure and the metal shell is disposed in the hole.

9. The casing for the portable device according to claim 1, wherein a second bottomed concave shape, which is inversely concave with regard to the first bottomed concave shape, is disposed in a bottom surface of the first bottomed concave shape.

10. A portable device having a casing for the portable device according to claim 1.

11. A portable device having a casing for the portable device according to claim 9 wherein a switch is disposed in the second bottomed concave shape.

12. A casing for a portable device, comprising:
an internal metal structure in which a first bottomed concave shape having a bottom surface and at least two side walls is disposed; and
a metal shell that is formed on both sides of the side wall and that includes a material that has greater thermal shrinkage during cooling than a constituent material of the internal metal structure, wherein
at least one of the at least two side walls has a convex portion at an end of the side walls, and
the convex portion sticks out to an outside of the first bottomed concave shape, and extends into the metal shell.

* * * * *